March 17, 1931.  L. W. BROWNE  1,796,558
VALVE MECHANISM
Filed July 2, 1928
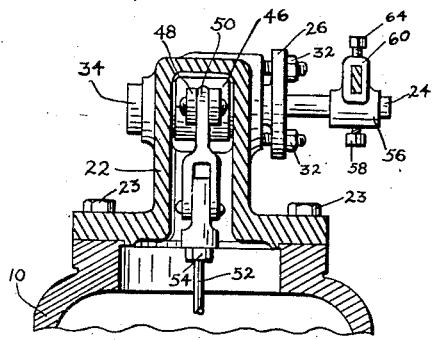
Fig. 3.
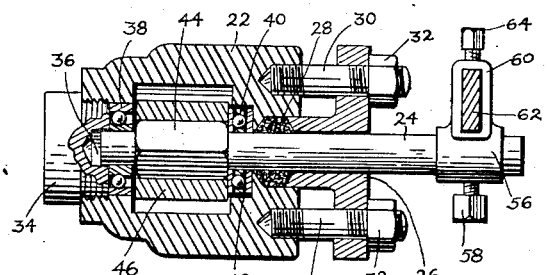
Fig. 4.
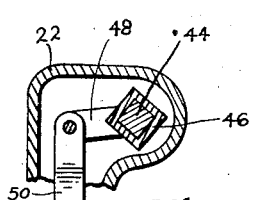
Fig. 5.
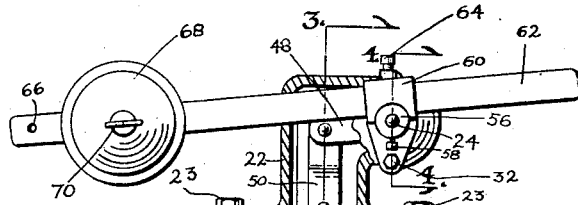
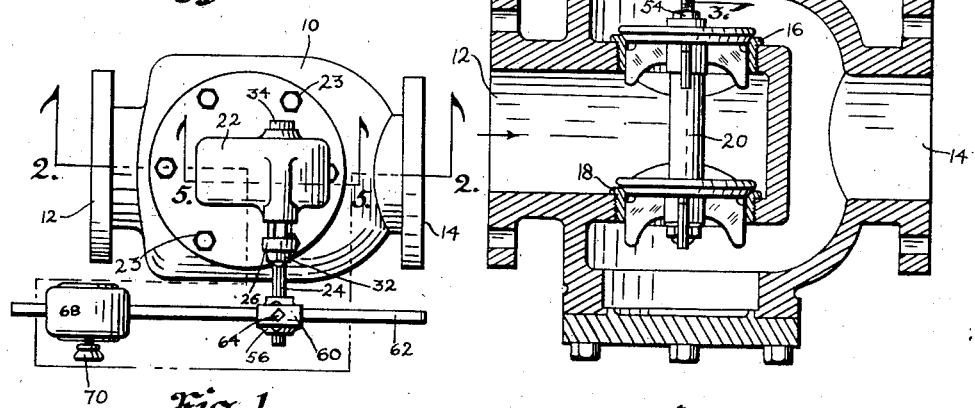
Fig. 1.    Fig. 2.
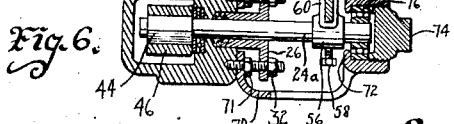
Fig. 6.
Witness
Solomon
Betensky
Inventor
Lyle W. Browne
by Bair, Freeman & Sinclair
Attorneys Patented Mar. 17, 1931

1,796,558

UNITED STATES PATENT OFFICE

LYLE W. BROWNE, OF MARSHALLTOWN, IOWA, ASSIGNOR TO THE FISHER GOVERNOR COMPANY, OF MARSHALLTOWN, IOWA

VALVE MECHANISM

Application filed July 2, 1928. Serial No. 289,996.

The object of this invention is to provide an improved construction for a lever-operated valve mechanism having a rotating stem, and an improved method of attaching the lever to the rotating stem to insure rigidity and yet permit easy adjustment of the lever to any installation condition.

A further object of the invention is to provide a valve mechanism of the character set forth especially designed to reduce friction to a minimum so that a very small amount of force is required for satisfactory operation of the valve.

Still another object of the invention is to provide a valve mechanism designed for controlling the flow of fluids in which high pressures may be present, said valve mechanism including a rotating stem, whereby the wear on the packing is reduced and whereby a stuffing box may be employed which can be tightly packed without exerting too much friction on the stem.

Another and further object of the invention is to provide such a valve mechanism in which the rotating stem is provided with radial and end thrust anti-friction bearings to insure perfect alignment and sensitive operation under all pressure conditions.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view illustrating my improved valve.

Figure 2 is a vertical sectional view through the mechanism taken on the line 2—2 of Figure 1 on an enlarged scale.

Figure 3 is a vertical sectional view taken on the line 3—3 of Figure 2, illustrating the connections to the rotating stem.

Figure 4 is a vertical sectional view taken on the line 4—4 of Figure 2 on a further enlarged scale, illustrating particularly the method of mounting the rotating stem.

Figure 5 is a detail, vertical sectional view taken on the line 5—5 of Figure 1, illustrating particularly the method of mounting the rocking arm to the rotating stem; and Figure 6 is a detail, sectional view, taken on the same section line as Figure 4, illustrating a slightly different arrangement of the bearings.

The valve mechanism which comprises my present invention is intended for service in controlling the flow of fluids under conditions where an outside force is utilized to operate the valve and where conditions of high temperature, high pressure, and possible chemical action are apt to be encountered. This valve may be used for controlling the flow of water, oil, gas, steam, air and other fluids and may be operated to open or closed position by float devices of common and well known form arranged to operate at predetermined levels of the fluid. Such valves must be designed so as to eliminate friction so far as possible and to insure satisfactory operation of the valve mechanism with the application of a small amount of force. In other words, all the parts must be so constructed, arranged and assembled as to insure perfect alignment and sensitive operation under all conditions.

In the accompanying drawings, I have employed the numeral 10 to designate generally a valve body which may be of any approved form and size. The valve body 10 is provided with an inlet port 12 and an outlet port 14, between which are arranged a plurality of ports equipped with valve seat rings 16 and 18 respectively.

Cooperating with the valve seats 16 and 18, is a double-seated balanced or semi-balanced valve device 20 having faces designed to contact with the respective valve seats.

Communicating with the upper portion of the valve body 10 is a valve body bonnet 22 of substantially right-angled form having a vertical portion arranged substantially axially of the valve seats 16 and 18, and a horizontal, laterally extending portion at its upper end. The bonnet 22 is flanged at its base and is mounted to the valve body 10 by means of cap screws 23.

A stem or shaft 24 is rotatably mounted transversely of the horizontal portion of the bonnet 22. The stem 24 emerges from the bonnet 22 through a flanged packing gland 26 having packing 28 surrounding the stem, said gland being held in place by any suitable means such as stud bolts 30 having nuts 32 thereon.

Opposite the packing gland 26, the bonnet 22 is formed with an opening which is closable by a screw plug 34, having at its inner end, a recess 36 to receive the inner end portion of the stem 24.

For service where a high degree of sensitivity is desired, such as under high pressure conditions, it is desirable to provide antifriction bearings for the rotating stem 24 and for this purpose, I have shown in Figure 4 a ball bearing assembly 38 for the inner end portion of the stem 24 and located adjacent the screw plug 34.

At the opposite side of the bonnet 22 and adjacent the point where the stem 24 emerges therefrom through the packing gland 26, I have shown a thrust bearing assembly 40 engaging said stem and mounted in a recess 42 formed in the bonnet.

It is not necessary that the bearing assemblies 38 and 40 be mounted in the particular manner shown, but they should be arranged in spaced relation on the stem 24 to take care of radial and end thrust.

For instance the assembly 38 may be arranged in a yoke or the like outside the bonnet.

For example in Figure 6, I have shown a yoke 70 supported on the bonnet 22. In this form of valve stem mounting the outer end of the stem 24a, which corresponds to the stem 24 is journaled in the ball bearing assembly 38a like the assembly 38. The assembly 38a is mounted in the outer portion of the yoke 70 between the annular shoulder 72 and the rib 76 on the removable plug 74.

The rotating stem 24 and the bearing members 38 and 40 may be inserted in and removed from the bonnet 22 through the opening which is closable by the plug 34.

That portion of the rotating stem 24 which is within the chamber of the bonnet 22 is formed preferably, square or otherwise angular in cross section, as designated by the numeral 44 and a hub member 46 is fitted thereto and is adapted to be mounted thereon by endwise movement. The angular hub member 46 is formed with a rocker arm 48, which occupies a substantially horizontal position within the horizontal portion of the bonnet 22 and has its free end projecting above the axial portion of the valve member 20 when the parts are assembled.

A link 50 is pivoted to the free end portion of the rocker arm 48 and is forked at its lower end and pivotally connected to the valve stem 52 of the valve 20. The connection of the valve stem 52 at both its upper and lower ends preferably is by threading, so that the distance between the valve and the link 50 may be adjusted and such adjustment is maintained by means of lock nuts 54 on the stem.

The projecting portion of the rotating stem 24 is provided with a hub member 56 which is mounted thereon and held in desired position by means of a set screw 58. The hub member 56 is formed with a looped guide portion 60, which has an opening therein at right angles to the axis of the rotating stem 24 and a valve lever 62 extends through said guide portion and is held therein in any desired position of adjustment by means of a set screw 64.

One end portion of the lever 62 is shown as provided with an aperture 66 by means of which it may receive connection through a link, not shown, with an actuating mechanism such as a float device.

Adjustably mounted on the valve lever 62 is a counterweight 68 which is held in any desired position of adjustment by means of a thumb screw 70.

It will be observed that oscillation of the lever 62 through the actuating means provided for it will result in a rotary oscillation of the rotating stem 24 and the result will be an oscillation of the rocker arm 48 in a vertical plane and consequently, a reciprocation of the valve stem 52 through the link 50. This movement results in an opening or closing movement of the valve 20 and it should be noted that although the mechanism is here shown as arranged for opening of the valve 20 when an upward pull is exerted on the valve lever 62, yet the parts may be so arranged, by shifting the lever 62 in its guide 60, that an upward pull on the lever will result in closing of the valve.

By employing a rotating valve stem such as 24, I have provided a construction in which friction is reduced to a minimum so that a very small amount of force is required for operating the valve mechanism and have thus produced a valve mechanism which is especially fitted for sensitive and exacting service. The rotating stem has very little wearing effect on the packing 28 and permits the use of a packing gland which can be tightly packed for high pressure service.

The use of anti-friction bearings results in a further reduction of friction by providing sensitive bearings for the rotating stem 24 and the thrust bearing 40 has the additional function of minimizing and overcoming end thrust which may be exerted on said rotating stem because of high pressure within the valve device.

The method of connecting the valve lever 62 to the vertically movable valve stem 52 through the use of the rotating stem 24, rocker arm 48 and pivoted link 50 is advantageous in providing an efficient and sensitive valve controlling mechanism and one which is easily assembled and disassembled for repairs or replacement of parts.

The method of attaching the lever 62 to the rotating stem 24 also is advantageous in that it provides a rigid connection between these parts and yet, one which is capable of easy and quick adjustment of the lever to any installation conditions which may be encountered.

It will also be noted that the rocker arm 48 is readily assembled to the rotating stem 24 by slipping the stem through the hub member 46 until the squared portion 44 of the stem is received within said hub.

The squared portion 44 of the rotating stem 24 comprises an enlarged portion on said stem, which may result in end thrust thereon when high pressures are present in the valve casing and it is to counteract this end thrust that I have provided the thrust bearing 40.

In the event it is desired to place the lever 62 in a different position from that shown in the drawing, the cap screws 23 may be removed and the extension or bonnet may be rotatably adjusted on the valve body until different sets of openings for the cap screws are in alignment, after which the cap screws are replaced.

The hub member or sleeve 46 on the rotating stem is of sufficient length to fill the space between the ball bearing 38 and thrust bearing 40. Because of this, effective means is provided for preventing end movement of the member 46 or lateral oscillation or play of the rocker arm 48, and said member 48 is kept in line with the valve stem.

While I have shown my valve operating mechanism in a structure embodying a globe type of valve body and a doubleseated semi-balanced valve device, yet it is my intention to cover by my claims, any form of structure in which the valve operating mechanism might be used in connection with a valve device.

I claim as my invention:

A valve mechanism comprising a casing having inlet and outlet ports, a valve device for controlling communication between said ports, an extension on said casing, a stem journaled in said extension and projecting through one wall thereof, said stem having an enlarged portion within said extension, a thrust bearing interposed between said enlarged portion and the adjacent wall of the extension, a ball bearing for said stem spaced from said thrust bearing, a lever connected to the projecting portion of said stem, a rocker arm within the extension having a hub fitted to the enlarged portion of said stem, and a link pivotally connecting said rocker arm to the valve device for operating the latter as said lever is oscillated.

LYLE W. BROWNE.